United States Patent [19]

Kikuchi

[11] Patent Number: 5,384,848
[45] Date of Patent: Jan. 24, 1995

[54] ENCRYPTED VIRTUAL TERMINAL EQUIPMENT HAVING INITIALIZATION DEVICE FOR PREVENTING REPLY ATTACK

[75] Inventor: Hiroaki Kikuchi, Kawasaki, Japan
[73] Assignee: Fujitsu Limited, Kawasaki, Japan
[21] Appl. No.: 113,909
[22] Filed: Aug. 31, 1993
[30] Foreign Application Priority Data Mar. 11, 1993 [JP] Japan .................................. 5-050550

[51] Int. Cl.⁶ ............................................. H04L 9/00
[52] U.S. Cl. ........................................ 380/48; 380/46; 380/49
[58] Field of Search ............................. 380/46, 48, 49

[56] References Cited

U.S. PATENT DOCUMENTS

| | | | |
|---|---|---|---|
| 4,203,166 | 5/1980 | Ehrsam et al. | 380/49 |
| 4,211,891 | 7/1980 | Glitz | 380/46 |
| 4,264,781 | 4/1981 | Oosterbaan et al. | 380/46 |
| 4,369,434 | 1/1983 | Mueller | 380/46 |
| 4,484,027 | 11/1984 | Lee et al. | 380/46 |
| 4,658,436 | 4/1987 | Hill | 380/46 |
| 4,797,672 | 1/1989 | Kousa | 380/46 |
| 4,817,148 | 3/1989 | Lafferty et al. | 380/48 |
| 5,020,105 | 3/1991 | Rosen et al. | 380/49 |
| 5,134,656 | 7/1992 | Kudelski | 380/48 |
| 5,297,208 | 3/1994 | Schlafly et al. | 380/49 |

FOREIGN PATENT DOCUMENTS

| | | |
|---|---|---|
| 0100106 | 2/1984 | European Pat. Off. . |
| 0326699 | 8/1989 | European Pat. Off. . |

OTHER PUBLICATIONS

Internet Engineering Task Force, Telnet Working Group, D. Borman, Editor, Cray Research Inc., *Telnet Data Encryption Option*, Jul. 1991.
Internet Engineering Task Force, Telnet Working Group, D. Borman, Editor, Cray Research, Inc., *Telnet Encryption: DES 64 bit Cipher Feedback*, Jul. 1991.
Internet Engineering Task Force, Telnet Working Group, D. Borman, Editor, Cray Research Inc., *Telnet Encyption: DES 64 bit Output Feedback*, Jul. 1991.
Internet Engineering Task Force, Telnet Working Group, D. Borman, Editor, Cray Research, Inc., *Telnet Authentication Option*, Jul. 1992.

*Primary Examiner*—Salvatore Cangialosi

[57] ABSTRACT

An apparatus which encrypts data transferred through a network during a session between a client terminal and a server. The client terminal issues a channel establishment command to start the session and includes a first encryption device and a first decryption device which are both initialized at the start of the session. A server is responsive to the channel establishment command so that the server communicates with the client terminal through the network during the session. The server includes a second encryption device and a second decryption device which are initialized at the start of the session. The server also includes a random data generator which generates random data in response to the issuance of the channel establishment command by the client terminal. The random data is used to initialize the first and second encryption devices and the first and second decryption devices and to set the encryption for the session.

8 Claims, 4 Drawing Sheets

ENCRYPTED VIRTUAL TERMINAL EQUIPMENT HAVING INITIALIZATION DEVICE FOR PREVENTING REPLY ATTACK

BACKGROUND OF THE INVENTION

1. Field of the Invention

The present invention relates to encrypted virtual terminal equipment which is resistant to security invasions such as wiretapping or pretending to be a proper user in a network environment that a plurality of computers are connected therewith.

2. Description of Related Arts

In recent distributed processing environments, a remote virtual terminal service (hereinafter abbreviated as a TELNET) is widely utilized, which can manipulate a computer installed remotely via a network as if it were directly connected therewith.

On the other hand, it is a general trend that a present development of products is effected by a synergic working among specified organizations having a high reliable technology. Therefore, in order to support the synergic working between these organizations, network applications which include the TELNET are worthy of notice.

Nevertheless, since these network applications are based on an open architecture, it has been a problem of utmost importance that wiretapping and falsification are easily performed.

For this reason, a development of cryptographical technique which enhances the degree of security in the field of network applications has been eagerly pursued.

A prior art encrypted virtual terminal device was designed to prevent an intruder's attack, such as wiretapping or the like by encrypting a whole session including a password.

However, even if the session were encrypted, improper user can wire tap a whole session passing through a network between an encrypted client and an encrypted server to record the contents thereof. Thereafter, he can transmit the recorded data to the encrypted server, allowing him to pretend to be a proper user.

In this case, a false user or false pretender cannot understand a content of communication, but he may succeed in receiving the past communicated content in the encrypted server under the pretense of a proper communication. Further, since there is a good chance that the communicated content may include, for example, a file cancel command or the like, it is quite dangerous that data of a computer can be destroyed.

This is a positive attack that is regarded as a reply attack. It is important for a network to prevent such attack.

On the other hand, as a technology for preventing a false user from cryptanalyzing, a subscription broadcasting system is provided with means for broadcasting regularly an initialized data of the encryption device. Also, a scramble communication system can provide several kinds of random number patterns and any of these patterns are selected. These systems are well known.

The above two technologies are concerned with a broadcast system which unidirectionally transmits information from a transmitting side to a receiving side. Data that initializes the encryption device at the transmitting side is produced and it is transmitted to the receiving side, to thereby prevent a cipher from being interpreted. For these technologies, it is not possible to obstruct an attack based on the above-mentioned reply attack method.

As described above, an effective defending method against an offensive by the reply attack has never been known.

SUMMARY OF THE INVENTION

The present invention is devised to improve the prior art drawbacks.

An object of the present invention is to provide encrypted virtual terminal equipment having an initialization device in which each encrypt/decrypt means for transmitting and receiving data is incorporated in each server and client for performing virtual terminal services, said equipment including a random data generator means for generating random data Conf in an encrypted server, wherein when a channel between the encrypted server and an encrypted client is established, random data Conf is transmitted from the encrypted server to the encrypted client, and thereby, each encrypt/decrypt means in both said encrypted server and said encrypted client has been initialized and a whole of the session thereafter is encrypted.

PREFERRED EMBODIMENT OF THE INVENTION

The present invention will be described in comparison with the prior art device.

Figure 1:
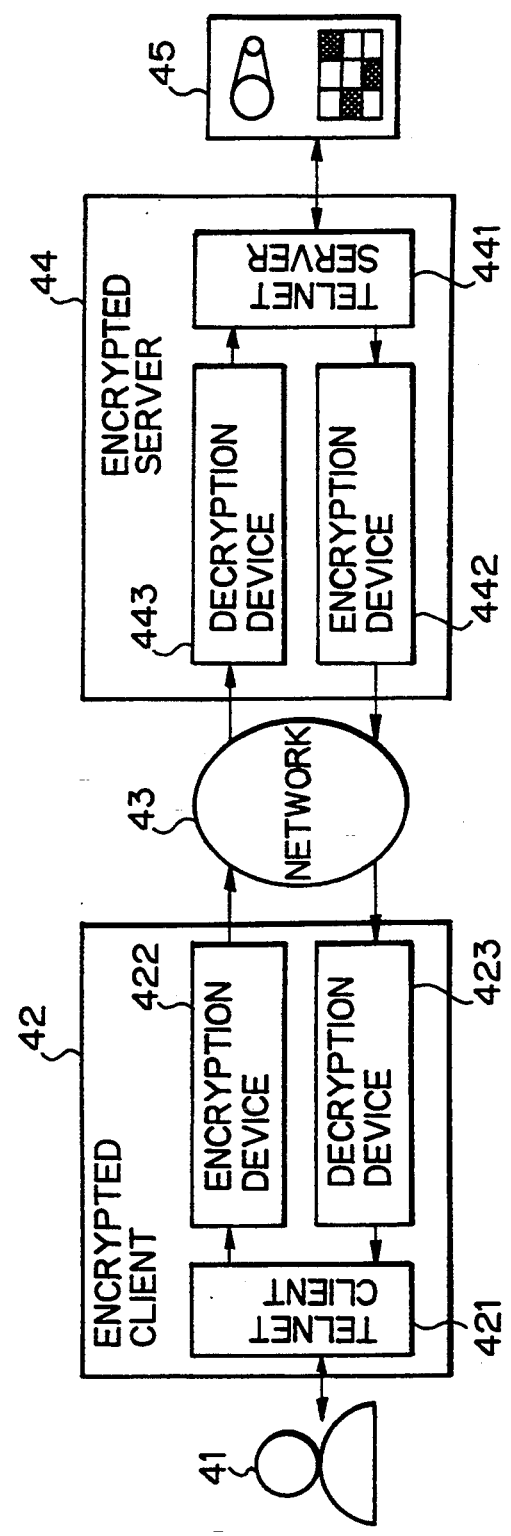
FIG. 1 is a schematic view showing a prior art encrypted virtual terminal equipment.

FIG. 1 is a schematic view showing prior art encrypted virtual terminal equipment. In FIG. 1, reference numeral 41 denotes a user, 42 an encrypted client, 421 a telnet client, 422 an encryption device which is encrypted by a cipher key in which a signal to be transmitted has been distributed in advance, and 423 a decryption device that is decrypted by a cipher key in which a received signal has been distributed in advance.

Reference numeral 43 is a network, 44 an encrypted server, 441 a telnet server, 442 an encryption device which encrypts the received signal by a cipher key distributed in advance, 443 an decryption device which decrypts a signal to be sent by means of a cipher key by a cipher key distributed in advance, and 45 a computer which performs a requested processing by a user.

In FIG. 1, a key input of the user 41 is encrypted in an encryption device 422 of the encrypted client 42 to be sent to the network 43.

A cipher data sent from the user 41 is decrypted by a decryption device 443 of the encrypted server 44. The encrypted server 44 transmits the decrypted data to the computer 45 as if it were a key input of the user. The computer 45 performs the requested processing from the user, outputs the response to the encrypted server 44 and the response of the computer 45 is reported to the user via a network 43 by means of the same procedure as stated above.

The prior art encrypted virtual terminal equipment was designed to prevent an intruder's attack, such as eavesdropping, by encrypting a whole session including a password.

However, even if a whole session were encrypted as stated above, a man wiretap can intercept a whole session intact passing through the network 43, and to record it. Then if he again transmits the data to the encrypted server 44 thereafter. In this manner he could pretend to be a proper user.

A false user or pretender to be a proper user cannot understand a content of communication, but he may succeed in receiving the past communication content in the encrypted server under the pretense of a proper communication.

Further, since there is a good chance that the communication content may include, for example, a file delete command or the like, it is quite dangerous is that the data in the computer could be destroyed. Therefore, it is an important issue in the working of a network to prevent a positive attack, such as a reply attack by a false user.

On the other hand, it is well known to those skilled in the art that there is a subscription broadcasting system and a scramble communication system as a technique for preventing a false user's cryptanalysis. These techniques relate to a unidirectional broadcasting system for transmitting information from the transmitting side to the receiving side and intend to produce data for initializing the encryption device at the transmitting side and send it to the receiving side, to thereby prevent a cipher from being interpreted. Despite the application of these techniques, it is not possible to obstruct an attack by the reply attack method.

Inadvertently, when these techniques are applied to the encrypted virtual terminal equipment as shown in FIG. 1, for example, when information is transmitted from the encrypted client side to the encrypted server side, data for initializing the encryption device 442 and the decryption device 443 is sent to the encrypted server 44. Then secret information will be transmitted. In this case, since the initializing data is being transmitted from the encrypted client side to the encrypted server side, if the false user wiretaps both the initialization value and a whole of the ciphers and transmits them again to the encrypted server 44, it is possible for the encrypted virtual terminal equipment to submit itself to the above reply attack.

Figure 2:
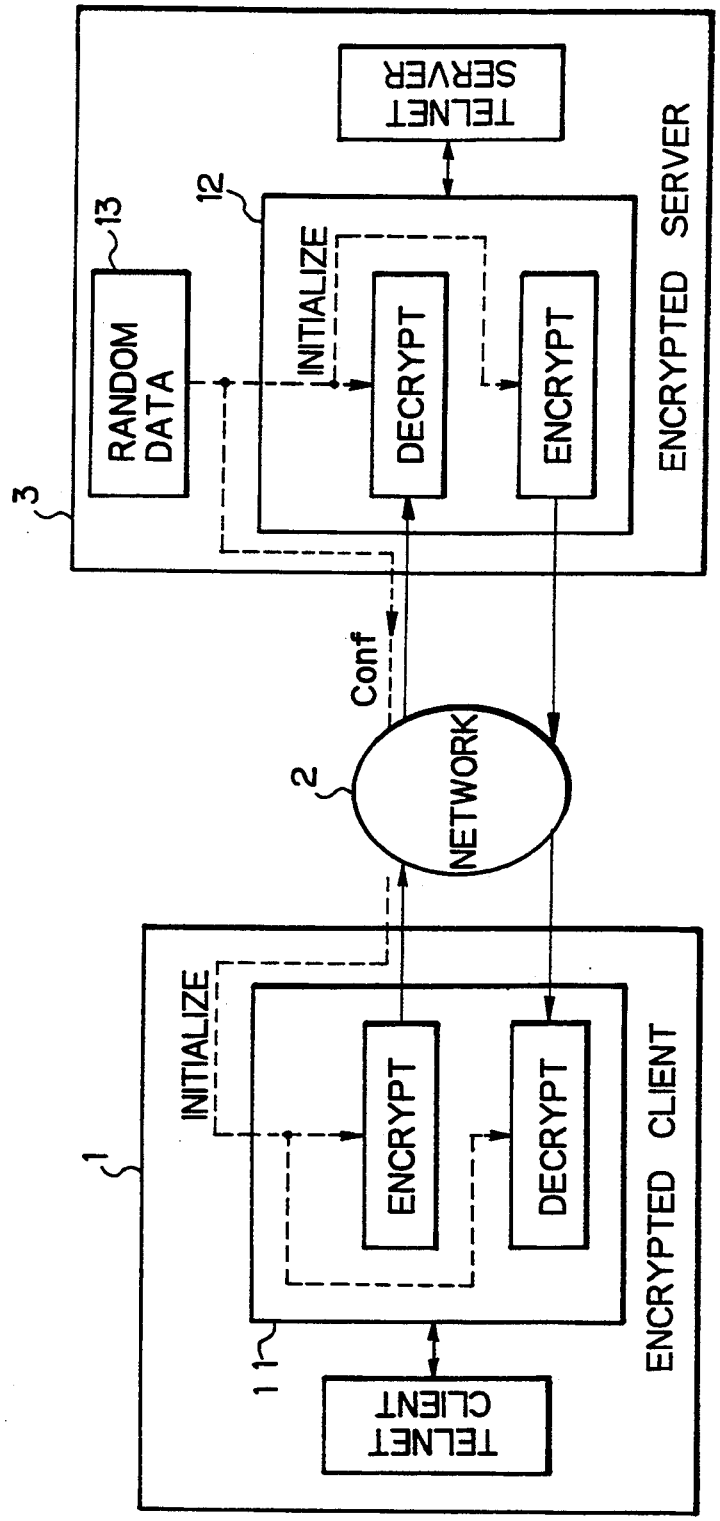
FIG. 2 is a block diagram explaining a principle of the present invention.

FIG. 2 is a block diagram explaining a principle of the present invention. In FIG. 2, reference numeral 1 denotes an encrypted client in a virtual terminal service (TELNET), 2 a network, 3 an encrypted server in TELNET, 11 and 12, each encrypt/decrypt means, and 13 a random data generator means for generating random data or "confounder" (abbreviated as "Conf").

To solve the problems, as shown in FIG. 2, the present invention is devised. In accordance of an aspect of the present invention, there is provided encrypted virtual terminal equipment in which encrypted/decrypted means 11, 12 for transmission and reception of data are incorporated in a server and an client which realizes virtual terminal services or TELNET, wherein random data generator means 13 for generating random data Conf is provided in an encrypted server 3. When a channel between the encrypted server 3 and an encrypted client 1 is established, said random data Conf is transmitted from the encrypted server 3 to the encrypted client 1 and thereby, said respective encrypt/decrypt means 11, 12 of said encrypted server 3 and said encrypted client 1 are initialized and a whole of the session thereafter is encrypted.

In FIG. 2, at the starting time of a session, if a channel establishment command is sent from an encrypted client 1 to an encrypted server 3, the encrypted server 3 produces random data Conf by a random data generator means 13, thus initializing the encrypt/decrypt means 12 of the encrypted server 3 by the random data Conf. The above random data Conf is sent to the encrypted client 1, to initialize the encrypt/decrypt means 11 of the encrypted client 1.

Then, based on a cipher key issued in advance, the transmission information is encrypted and a communication between the encrypted client 1 and the encrypted server 3 is effected. For example, if information such as commands or the like is sent from the encrypted client 1 to the encrypted server 3, the encrypted server 3 decrypts the sent information by the encrypt/decrypt means 12 and sends it to a computer (not shown in the figure) for processing thereof according to a request of the encrypted client 1, to thereby return a response from the computer to the encrypted client 1. The above random data Conf is provided every session. A respective session which effects the same processing is encrypted such as that the encryption is different every session.

In accordance with the present invention, random data Conf is always created at the encrypted server side and the encrypt/decrypt means 11, 12 in both the encrypted server 3 and the encrypted client 1 are initialized. Moreover, since a respective encryption device in the above-mentioned server 3 and client 1 is initialized such that it is different each other every time with each session, a false user or an intruder cannot succeed in a reply attack. Even if a false user wiretaps intact a communication between the encrypted server 3 and the encrypted client 1 and records the content of it, a reply attack which transmits the recorded data to the encrypted server again, cannot be successfully implemented. This is because random data Conf is sent from the encrypted server 3 to the encrypted client 1 and the cipher data has already been quite different from each other.

Figure 3:
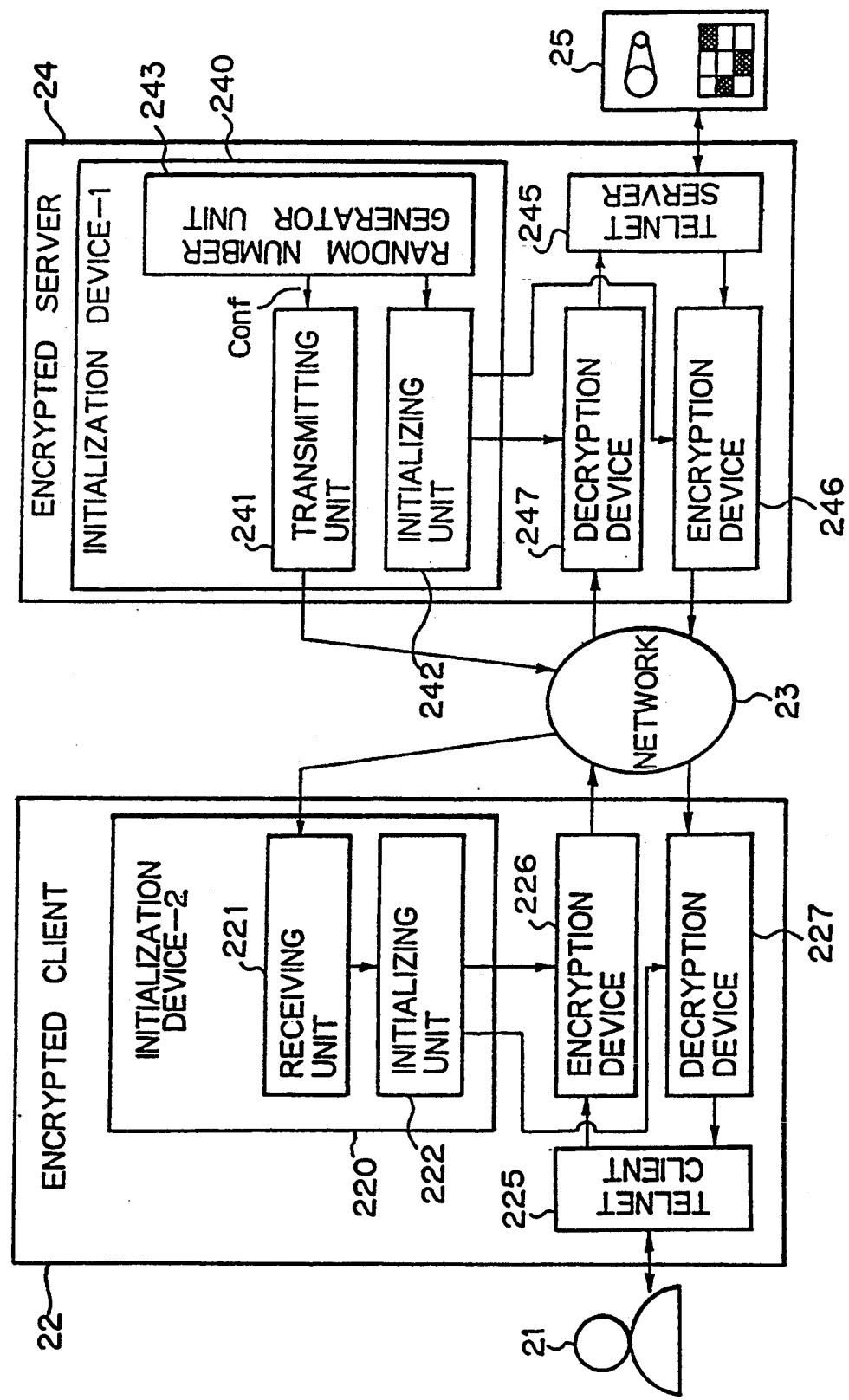
FIG. 3 is a schematic view showing the whole structure of an embodiment in accordance with the present invention.

FIG. 3 is a schematic view showing the whole structure of an embodiment in accordance with the present invention.

In FIG. 3, reference numeral 21 denotes a user, 22 an encrypted client, 225 an above-noted TELNET client, 226 an encryption unit which encrypts data to be sent by a secret key distributed in advance, 227 a decryption unit which decrypts received data by an advance-distributed secret key, 220 an initialization equipment No. 2 which initializes the encryption unit 226 and decryption unit 227 by a random data or confounder (abbreviated by Conf) sent from a server, 221 a receiving unit which receives a Conf sent by an encrypted server 24, 222 an initialization unit which initializes the encryption unit 226 and decryption unit 227 by a Conf received by the receiving unit 221.

On the other hand, reference numeral 23 denotes a network, 24 an encrypted server, 245 a telnet server, 246 an encryption unit which encrypts received data by a prior-distributed secret key (or an encrypted key), 247 a decryption unit which decrypts data to be sent by a secret key distributed in advance, 240 an initialization equipment No. 1 which initializes the encryption unit 246 and the decryption unit 247, 241 a transmitting unit which transmits a Conf to the encrypted client 22, 242 an initialization unit which initializes the encryption unit 246 and the decryption unit 247 in the encrypted server 24,243 a random number generator unit which generates a Conf, and 25 a computer which executes processings requested by a user.

Next, the operation of an embodiment in accordance with the present invention as shown in FIG. 3 will be described hereunder.

In FIG. 3, when the encrypted client 22 sends a communication start command to the encrypted server 24, the random number generator unit 243 in the encrypted server 24 generates a Conf, and the random data Conf is sent to the initialization unit 242, which initializes the encryption device 246 and decryption device 247 by the random data Conf.

On the other hand, the random data Conf which is output by the random number generator unit 243 in the encryption server 24 is also sent to the encryption client 22 via a network 23 from the transmitting unit 241. The receiving unit 221 of the initialization equipment 220 in the encrypted client 22 receives the random data Conf and the initialization unit 222 initializes the encryption device 226 and the decryption device 227 through the random data Conf received.

Then, the transmitted data is encrypted based on the pre-distributed secret key (an encrypted key) in the initialized encryption device 226, to be sent to the encrypted server 24 via a network 23 from the encrypted client 22. The encrypted server 24 decrypts the transmitted data by the decryption device 246 which has been initialized by the random data Conf, to send it to the computer 25 as described above.

The above-described random data Conf is provided for every session and when the session executes all the same processing, it is encrypted every time in a different way. Further, the random data is created on the encrypted server (24) side. For this reason, a false user cannot pretend to be a proper user, thereby to enable preventing the reply attack.

Figure 4:
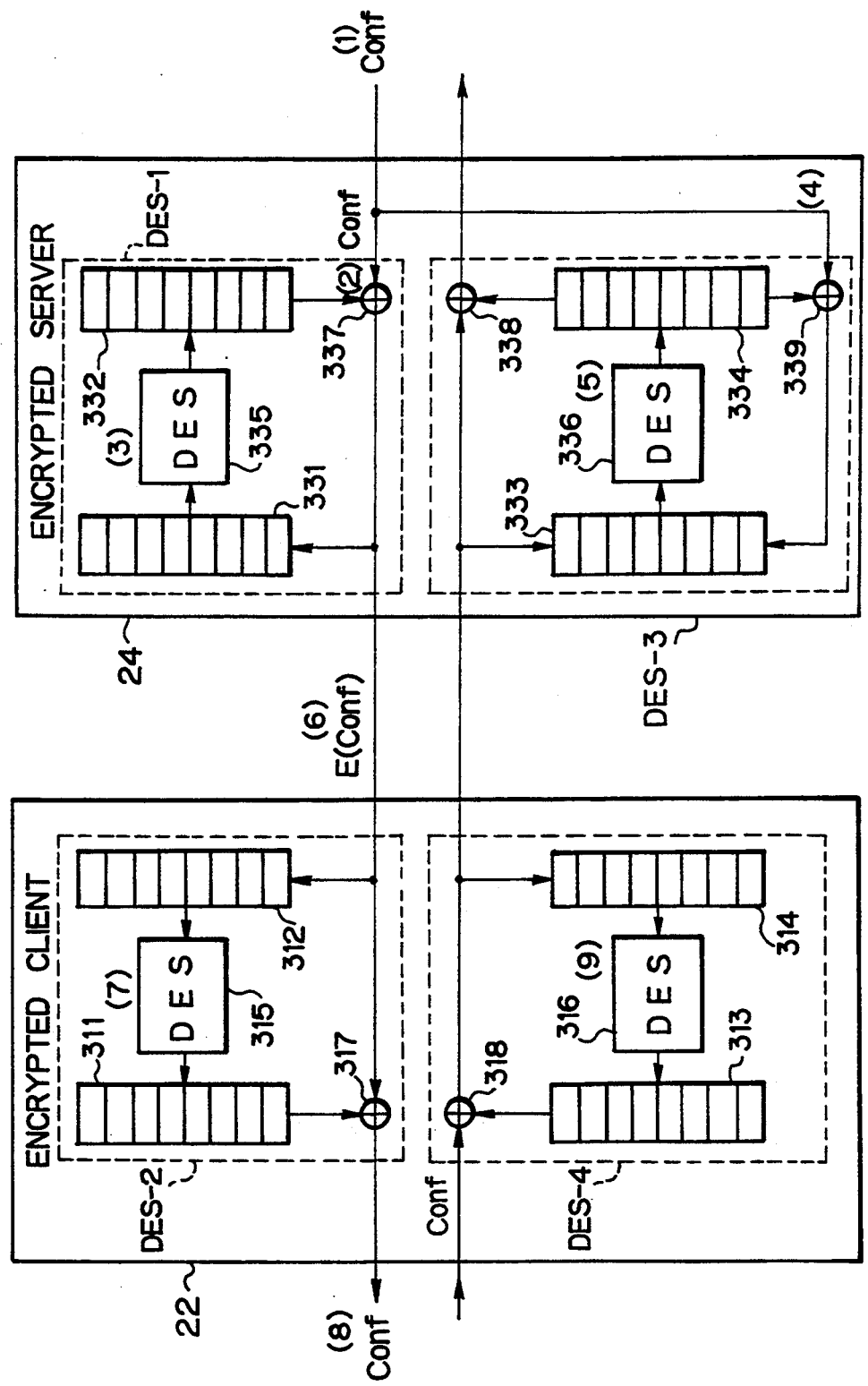
FIG. 4 is a schematic view showing an embodiment of the encryption device and the decryption device in accordance with the present invention as shown in FIG. 3.

FIG. 4 is a schematic view showing an embodiment of the encryption device and the decryption device in accordance with the present invention as shown in FIG. 3. In this embodiment a secret-key cryptosystem DES is utilized. In this case, the above-noted secret-key cryptosystem DES is composed of 64 bits of block ciphers and this is applied in a cipher feed back (CFB) mode, in order to utilize the DES as an encryption function every one byte necessary for the virtual terminal service (telnet).

In FIG. 4, reference numeral 22 denotes an encrypted client, 24 an encrypted server, DES1 is an encryption device of the encrypted server 24, DES2 a decryption device of the encrypted client 22, DES3 a decryption device of the encrypted server 24, DES4 an encryption device of the encrypted client 22.

Reference numerals 312, 314, 331, 333 are input buffers which store 8 bytes of data. 311, 313, 332, 334 are output buffers which store 8 bytes of data. 315, 316, 335, 336 are encryption units which encrypt data stored in the input buffers 312, 314, 331 and 333 based on the cipher key. The cipher keys in the encryption units 315, 316, 335 and 336 are all common therebetween.

Reference numerals 317, 318, 337, 338 and 339 denote exclusive OR circuits and Conf denotes random data.

In FIG. 4, data sent from the encrypted server 24 takes an exclusive OR operation with data fetched from an output buffer 332 of the encryption device DES1 in the exclusive OR circuit 337 by every one byte, to send the result of the exclusive OR operation to the encrypted client 22 via a network. The output of the exclusive OR circuit 337 is also stored in an input buffer 331 of the encryption device DES-1.

When eight byte-data is input to the input buffer 331 to fill it with data, the encryption unit 335 encrypts data stored in the input buffer 331 based on the cipher key to update an output buffer 332. When the output buffer 332 is updated, the exclusive OR circuit 337, as described above, finds an exclusive OR value from among the updated data of the output buffer 332 and the transmitting data, to send it to the encrypted client 22.

On the other hand, the data received at the encrypted client device 22 is again taken an exclusive OR value with a content of an output buffer 311 in the decryption device DEC-2 (which holds the same data in association with the encryption device DES-1) in the exclusive OR circuit 317, to be descrypted to the original data.

That is to say, after an exclusive OR value C of one data A and the other data B has been found, if an exclusive OR value of the exclusive OR value C and the above data B is found, the data A can be obtained. Therefore, an exclusive OR value of one data of the output buffer 311 (which holds the same data as the output buffer 332) and the other data which is sent from the encrypted server 24 is taken. In this manner the original data can be obtained.

The data sent to the encryption client device 22 is input to an input buffer 312 of the decryption device DES-2 by every one byte, as described above, and when the input buffer 312 is filled with data, a decryption unit 315 encripts the data stored in the input buffer 312 based on the cipher key, to update the output buffer 311.

As mentioned above, the encryption and decryption of data are performed and data is sent from the encrypted server 24 to the encrypted client 22. As is all the same, the encryption and decryption of data are performed by the encryption device DES-4 and the decryption device DES-3 and data is transmitted from the encryption client device 22 to the encrypted server 44.

In the embodiment of FIG. 4, when the encrypted client 22 sends a communication start command to the encrypted server 24 at a start time of the session, a random data Conf for preventing a reply attack is sent from the encrypted server 24 to the encrypted client 22, to thus initialize the encryption devices DES1, DES4 and the decryption devices DES2, DES3.

That is to say, first in the random number generator unit of the encrypted server 24, random data Conf is created and in the exclusive OR circuit 337 an exclusive OR value of a random data Conf and a content of an output buffer 332 is determined and sent to the encrypted client 22. On the other hand, the data to be sent to the encrypted client 22 is also stored in the input buffer 331. As described above, if the input buffer 331 is filled, the encryption unit 335 is activated and the data stored in the input buffer 331 is encrypted based on the cipher key to update the output buffer 332. Thus, first of all an initialization of the encryption device DES-1 is performed.

On the other hand, a random data Conf is also given to a decryption device DES-3 of the encrypted server 24. In the descryption device DES-3, as is the same with the above, an exclusive OR value of the random data Conf and an output buffer 334 is stored in the input buffer 333 and when the input buffer 333 is filled, a decryption device 336 is activated to update an output buffer 334.

Then, a cipher key of the encryption unit 336 is the same as that of the encryption device DES-1 and since a random data Conf which is the same as the encryption device DES-1 is offered to the decryption device DES-3, the decryption device DES-3 is initialized by the same data as that of the encryption device DES-1.

An encrypted random data E (Conf) which is an output of an exclusive OR circuit 337 of the encryption server 24 is sent to the encrypted client 22 via a network to be stored in an input buffer 312 of the decryption device DES-2 and at the same time therewith an exclusive OR value of the encrypted random data E and a content of the output buffer 311 is computed in an exclusive OR circuit 317. Then, when the input buffer 312 is filled therewith, as is the same as in the case of the encryption device DES-1 and the decryption device DES-3, an encryption unit 315 is activated to encrypt the content of the input buffer 312 by a cipher key and the output buffer 311 is updated. Then, as is the same as in the case of the encryption device DES-3, since the content of the input buffer 312 in the decryption device DES-2 is the same as the content of the input buffer 331 in the decryption device DES-1 and both cipher keys of the encryption devices DES-1 and DES-2 are the same, the encryption device DES-1 and the decryption device DES-2 are initialized by the same data.

Next, a decrypted random data Conf is given to the encryption device DES-4 of the encrypted client device 22 and the encryption device DES-4 is initialized as is the same as the above.

Thus, a once transfer of random data Conf is able to initialize the encryption devices DES-1 and DES-4 and the decryption devices DES-2 and DES-3 simultaneously.

In an embodiment shown in FIG. 3, a transmission unit 241a and a receiving unit 221a are provided in the initialization device, but in an embodiment of FIG. 4, a transmitting/receiving unit of a conventional encrypted data is diverted to that of random data.

As described above, in the above-noted embodiments, since the channels are initialized as follows, an attack by a reply attack can be prevented.

1. A client requests a server to start the communication.

2. The server creates an initialization value by random numbers and initializes a first channel from the server to the client, to transmit the initialization value to the client.

3. Based on the received initialization value, the client initializes a second channel from the client to the server.

4. The first and second channels are encrypted with regard to a cipher key which has been distributed in advance and the initialization value which has been composed in the above item 2, to thereby transmit or receive information.

In this case, if a false user intercepts a communication stated in the above item 1 to retransmit it, it does not do an actual harm thereto. Even if the false user wiretaps all the data of the second channel stated in the above items 2 and 4 to store it and thereafter repeatedly he pretends to be a legal client, since the initialization value is sent from the server by the above item 2, the encrypted data is quite different therefrom, and the false user fails in "a pretense of being a proper user".

On the other hand, even if the false user wiretaps the data of a first channel stated in the above item 2 and 4 and pretends to be a correct server, he cannot transmit a well-meaning response to the data which is transmitted from a different client every time. Therefore, this does not lead to an effective attack.

In the above-described embodiment, a secret-key cryptosystem utilizes the Data Encryption Standard which is abbreviated by DES. Nevertheless, the present invention is not only limited to the above-described embodiment, but also the other cryptosystems can be applied thereto.

I claim:

1. An apparatus which encrypts data transferred through a network during a session between a client terminal and a server, wherein a channel establishment command is issued to start the session, the apparatus comprising:

a client terminal which issues the channel establishment command and comprises:

a first encryption device, connected to the network, which is initialized at the start of the session and encrypts data to be transferred from the client terminal to the network during the session, and a first decryption device, connected to the network, which is initialized at the start of the session, receives encrypted data from the network during the session and decrypts the received encrypted data; and a server which is responsive to the channel establishment command issued by the client terminal so that the server communicates with the client terminal through the network during the session, the server comprising:

a second encryption device, connected to the network, which is initialized at the start of the session and encrypts data to be transferred from the server to the network during the session, a second decryption device, connected to the network, which is initialized at the start of the session, receives encrypted data from the network during the session and decrypts the received encrypted data, and a random data generator which generates random data in response to the issuance of the channel establishment command by the client terminal, the random data being used to initialize the first and second encryption devices and the first and second decryption devices.

2. An apparatus as in claim 1, wherein the random data is always generated by the server and is not generated by the client terminal, different random data being generated for each session and the first and second encryption devices and the first and second decryption devices are initialized for each session based on random data generated for the respective session, thereby preventing reply attacks by false users.

3. An apparatus which encrypts data transferred through a network during a session between a client terminal and a server, wherein a channel establishment command is issued to start the session, the apparatus comprising:

a client terminal which issues the channel establishment command and comprises:

a first encryption device, connected to the network, which is initialized at the start of the session and encrypts data to be transferred from the client terminal to the network during the session, and a first decryption device, connected to the network, which is initialized at the start of the session, receives encrypted data from the network during the session and decrypts the received encrypted data; and a server which is responsive to the channel establishment command issued by the client terminal so that the server communicates with the client terminal through the network during the session, the server comprising:

a second encryption device, connected to the network, which is initialized at the start of the session and encrypts data to be transferred from the server to the network during the session, a second decryption device, connected to the network, which is initialized at the start of the session, receives encrypted data from the network during the session and decrypts the received encrypted data, and a random data generator which generates random data in response to the issuance of the channel establishment command by the client terminal, the random data being used to initialize the first and second encryption devices and to set the encryption for the session.

4. An apparatus as in claim 3, wherein different random data is generated for each session and the encryption by the first and second encryption devices and decryption by the first and second decryption devices for a respective session is based on the random data generated for the respective session, thereby creating different encryption for each session.

5. An apparatus as in claim 3, wherein the server transmits the random data to the network and the client terminal further comprises:

a receiving unit which receives the random data from the network; and an initializing unit which initializes the first encryption device and the first decryption device in accordance with the received random data.

6. An apparatus as in claim 3, wherein the client terminal further comprises a telnet unit which allows a user to communicate with the network via the telnet unit.

7. An apparatus as in claim 3, wherein the server further comprises:

a transmitting unit which transmits random data from the random number generator unit to the client terminal via the network; and an initialization unit which initializes the second encryption device and the second decryption device in accordance with the random data.

8. An apparatus as in claim 3, wherein the server further comprises a telnet unit which allows an external computer to communicate with the network via the telnet unit.

* * * * *

UNITED STATES PATENT AND TRADEMARK OFFICE
CERTIFICATE OF CORRECTION

PATENT NO. : 5,384,848
DATED : January 24, 1995
INVENTOR(S) : Hiroaki KIKUCHI

It is certified that error appears in the above-indentified patent and that said Letters Patent is hereby corrected as shown below:

On the Title page:

After "Primary Examiner" entry, insert the following new line:
--Attorney, Agent or Firm - Staas & Halsey--.
Col. 1, line 16, after "utilized", delete the comma (",");
Line 35, after "like", insert a comma (",");
Line 37, after the second comma (","), insert --an--;
Line 38, delete "wire tap" and insert therefor
--wiretap-- (one word).
Col. 3, line 9, after "intact", insert a comma (",");
Line 9, delete "to".

Signed and Sealed this

Twenty-third Day of May, 1995

Attest:

BRUCE LEHMAN

*Attesting Officer*     *Commissioner of Patents and Trademarks*